United States Patent
Lee et al.

(10) Patent No.: US 7,429,975 B2
(45) Date of Patent: **\*Sep. 30, 2008**

(54) MAGNETIC OSCILLATION METRIC CONTROLLER

(75) Inventors: Wen-Chin Lee, Taipei (TW); Shang-Hao Chen, Taipei (TW)

(73) Assignees: Sunrex Technology Corp., Taichung Hsien (TW); Gimbal Technology Co., Ltd., Taipei (TW)

( * ) Notice: Subject to any disclaimer, the term of this patent is extended or adjusted under 35 U.S.C. 154(b) by 715 days.

This patent is subject to a terminal disclaimer.

(21) Appl. No.: 10/996,419

(22) Filed: Nov. 26, 2004

(65) Prior Publication Data

US 2006/0114228 A1    Jun. 1, 2006

(51) Int. Cl.
    *G09G 5/00*    (2006.01)
(52) U.S. Cl. ............... 345/156; 345/157; 345/164; 345/184
(58) Field of Classification Search ............. 345/156, 345/157, 184, 164; 324/207.2; 273/148
    See application file for complete search history.

(56) References Cited

U.S. PATENT DOCUMENTS

| | | | | |
|---|---|---|---|---|
| 6,075,518 A * | 6/2000 | Pruchniak | .............. | 345/157 |
| 6,809,275 B1 * | 10/2004 | Cheng et al. | ............. | 200/14 |
| 7,176,892 B2 * | 2/2007 | Kobayashi | ............. | 345/161 |
| 7,199,785 B2 * | 4/2007 | Ledbetter et al. | ......... | 345/156 |
| 2001/0055002 A1 * | 12/2001 | Endo | ................. | 345/156 |
| 2004/0130530 A1 * | 7/2004 | Gustafsson | ............. | 345/161 |
| 2005/0146500 A1 * | 7/2005 | Cheng | ................. | 345/163 |
| 2006/0044272 A1 * | 3/2006 | Koo et al. | ............... | 345/163 |
| 2006/0108999 A1 * | 5/2006 | Lee et al. | ............... | 324/207.2 |
| 2006/0109246 A1 * | 5/2006 | Lee et al. | ............... | 345/163 |
| 2006/0114229 A1 * | 6/2006 | Lee et al. | ............... | 345/163 |
| 2006/0114230 A1 * | 6/2006 | Lee et al. | ............... | 345/165 |

* cited by examiner

*Primary Examiner*—Sumati Lefkowitz
*Assistant Examiner*—Seokyun Moon
(74) *Attorney, Agent, or Firm*—Leong C. Lei

(57) ABSTRACT

A magnetic oscillation metric controller with return design comprised of a scrolling wheel mechanism, a dancer, a permanent magnet, a Hall sensor and a return structure to drive the permanent magnet by oscillation of the scrolling wheel mechanism to generate signals of changed magnetic fields resulted from displacement for achieving metric control purpose; and the return structure including an elastic stick to facilitate return after lateral or longitudinal displacement.

3 Claims, 7 Drawing Sheets

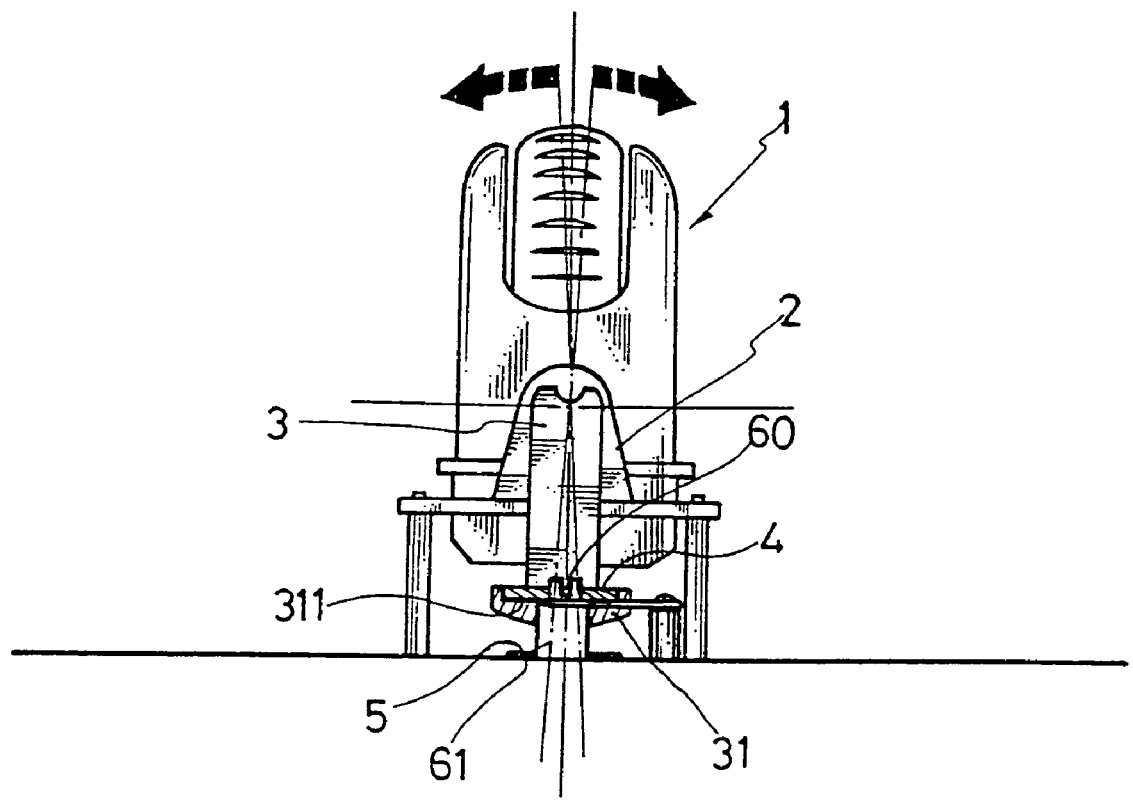
FIG. 4
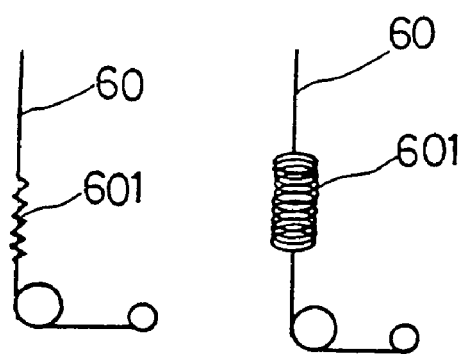
FIG. 5A   FIG. 5B

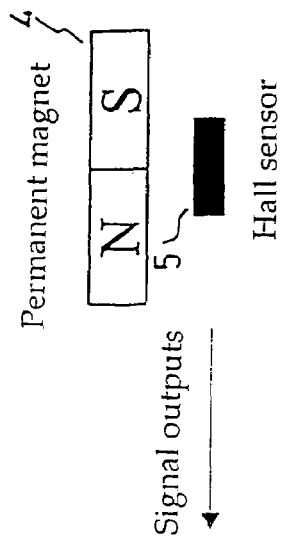
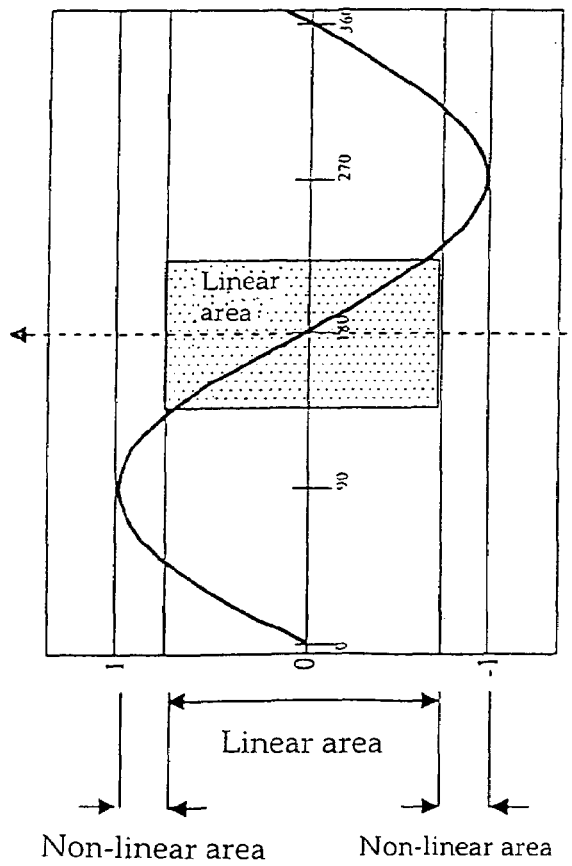
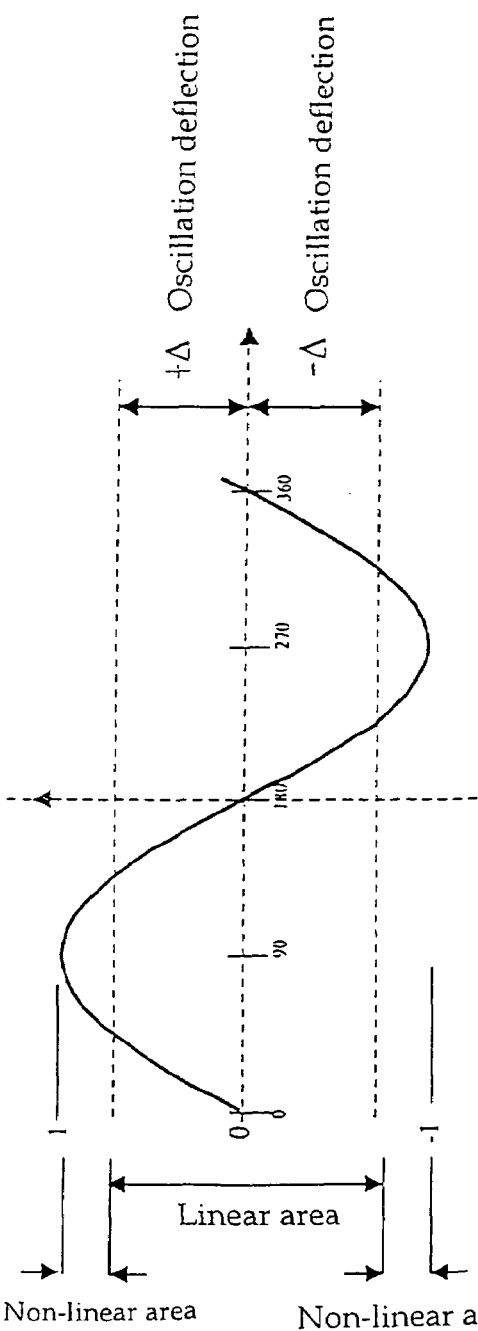
FIG. 8C
FIG. 8A
FIG. 8B

MAGNETIC OSCILLATION METRIC CONTROLLER

BACKGROUND OF THE INVENTION (a) Technical Field of the Invention

The present invention is related to a magnetic oscillation metric controller with return mechanism, and more particularly, to one that drives by oscillation the permanent magnet to displace thus to generate signals of changed magnetic field for further retrieving data of changed signals to achieve metric control purpose.

(b) Description of the Prior Art

From the keyboard at the beginning, till the introduction of cabled mouse, wireless cable or optical mouse today, many peripherals to control movement of cursor on monitor have been available in the history of the development of computer with the primary purpose to control three mechanisms including movement of the cursor, scrolling the screen and clicking to select.

FIG. 10 of the accompanying drawings shows the most advanced mouse structure up to now. Where in, the scrolling wheel mechanism is comprised of a wheel in conjunction with electronic circuit board and sensor device (optical grating theories) with the metric control of vector achieved by rotation forward or backward. The design focuses on the LH and RH lateral metric control. That is, the LH or the RH micro-switch executes the control by LH or RH deflective movement. As illustrated, a scrolling wheel mechanism (A2) provided on the carrying mechanism of a mouse (A1) relates to one control press bar (A4) each extending from LH and RH along an outer frame (A3) in relation to a LH and a RH micro-switches. When the scrolling wheel mechanism (A2) deflects to the left, the press bar to its right contacts the micro-switch (A5) provided on the right wall due to the level difference. If the scrolling wheel mechanism (A2) deflects to the right, the press bar to its right contacts the micro-switch (A5) provided on the right wall also due to the level difference, thus to achieve the mouse LH and RH lateral metric function.

The return structure of the mouse (A1) operates on an elastic clamping tongue (A6) in conjunction with a limiting tongue (A61) provided at the center of the structure to return the scrolling wheel mechanism (A2) by clamping force. Accordingly, once the scrolling wheel mechanism (A2) is swiveling to its left or right by the externally applied force, the force merely supplies the source of force and mechanism of return to the central position. When the scrolling wheel mechanism (A2) moves under the compression by the externally applied force, it takes a torsion coil to execute the upper and the lower return mechanism. In short, in the lateral and longitudinal return structure of the mouse (A1) of the prior art, it takes two sets of different return devices (including the elastic clamping tongue and the torsion coil) to respectively achieving the return purpose.

The prior art is found with the following flaws:

1. Problems with the touch mechanism. Design with the micro-switch is found with many problems including the presence of the action spacing, lower sensitivity and short service life are observed with the touch mechanism of the micro-switch.

2. Greater force needed to touch the micro-switch. This makes the operation uncomfortable putting the design of the touch micro-switch under serious criticism and trial.

3. The limited mechanical service life. Any failure or poor contact due to tear and wear of any micro-switch will frustrate the control and operation, or even prevent the micro-switch useless, thus to shorten the service life of the oscillation metric control structure that essentially operates on the micro-switch.

4. Higher production cost and more workstations in the assembly. With the comparatively more precise and complicated design, significant increase of total production is taken for granted.

5. Larger size. A pair of press bars must be provided by respectively extending from both sides of the oscillation structure to touch corresponding LH and RH micro-switches to fail the compact requirements, thus making it difficult to apply in the construction of a small size such as the mouse.

6. Fatigue and potential hazard. The clamping tongue used for the return mechanism in the oscillation metric control construction present greater elasticity even though the smallest size of clamping tongue is used. Therefore, the greater force to apply the prior art will subject the user to easily feel fatigue and potential hazard of getting hurt.

7. Less competitive. The installation of elastic tongue and the torsion coil required for the return structure means higher production cost and labor cost.

SUMMARY OF THE INVENTION

The primary purpose of the present invention is to provide a magnetic oscillation control with return device to eliminate those flaws found with the prior art. To achieve the purpose, a Hall sensor and permanent magnet are used to exit the micro-switch to provide the following advantages: Installation of the Hall sensor and the permanent magnet change the mechanical operation of the prior art into electronic operation without being subject to the service life of the switch thus to significantly increase the service life and reduce the production cost.

The present invention essentially operates on the signals from the magnetic filed thus to save the space otherwise occupied by LH and RH micro-switches in the prior art to significantly reduce the volume of the construction for easy application in a mouse device in smaller or special size.

Changes of signal from the magnetic field are synchronously generated with the oscillation, and then processed by the operation of the programs in a microprocessor, thus to allow adjustment and setup of the oscillation sensitivity for control purpose.

The electronic operation in the absence of micro-switch permits the oscillation sensitivity for control to be adjusted as desired by the user thus to meet the operation pattern of the individual user.

Signals from the magnetic field are consistent without being subject to interference from external noises, thus to provide consistent, reliable and precise control.

In the present invention, only an elastic return stick penetrating the return construction is used being subject to a dancer. Consequently, the elastic return stick operates consistently with that of the dancer to provide the source of return force, meaning, the dancer either deflected laterally or longitudinally, it returns to its original position as facilitated by the elastic return stick to allow easy control by the hand and assure of reliable and accurate return efficacy.

Whereas the elastic return stick constitutes the return construction for the present invention and is subject to the dancer and the entire scrolling wheel mechanism, the scrolling wheel mechanism is provided with the functions to control by compression the micro-switch disposed below and to automatically return to its original position. Therefore, the elastic return stick of the present invention provides dual purposes, respectively, production cost reduction by simplified devices, and lateral and longitudinal return.

The present invention allows the adjustment of the volume and size of related devices in conjunction with the updated electronic manufacturing technology depending on the application of the information productions requiring metric and control.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 4 is a front view of the present invention in operation.

FIGS. 5A and 5B are schematic views showing an elastic return stick of the present invention.

FIGS. 8A, 8B and 8C are schematic views of a first preferred embodiment of a permanent magnet and a Hall sensor of the present invention.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figures 1, 2:
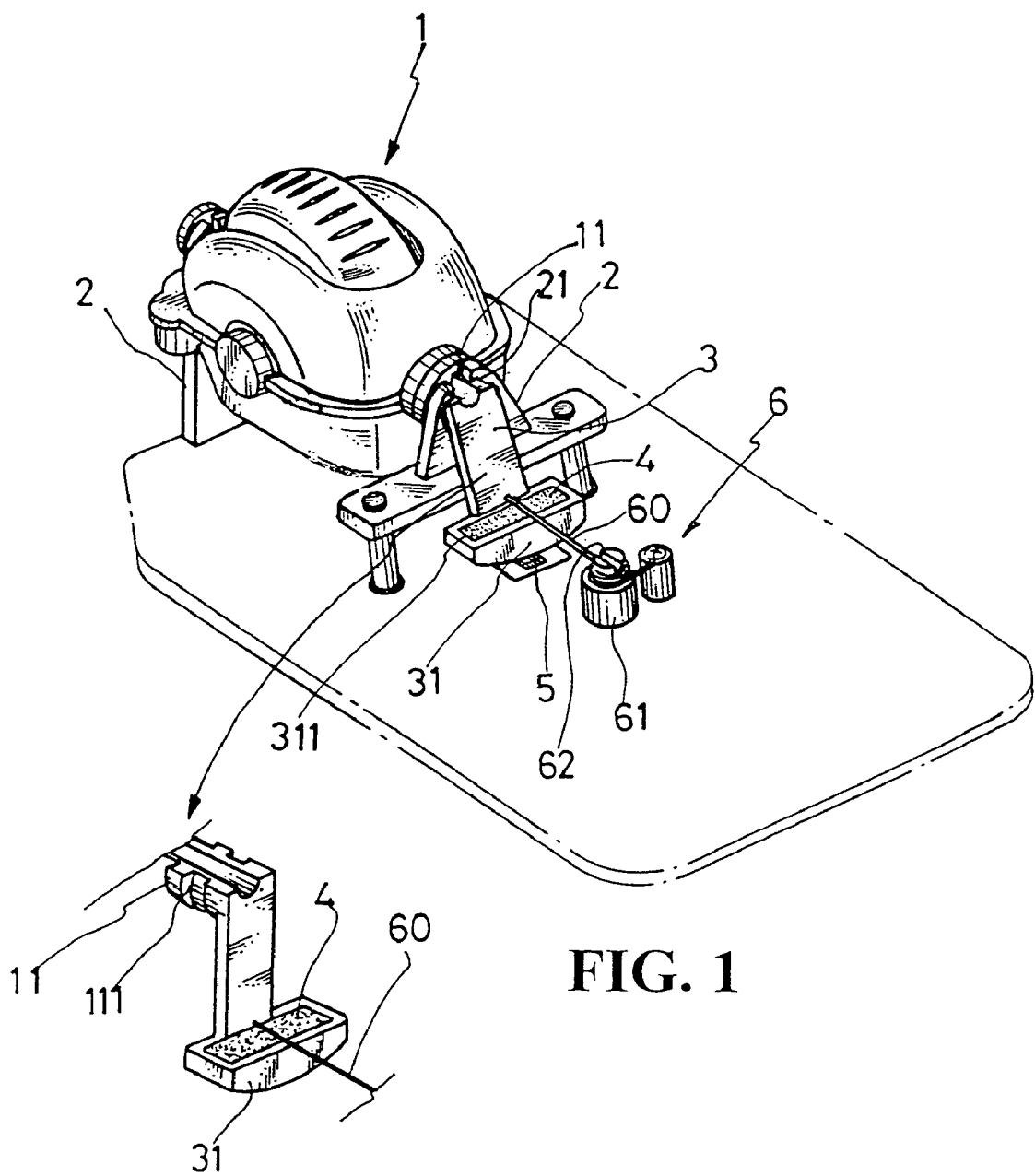
FIG. 1 is a perspective view of the present invention.
FIG. 2 is a schematic view showing the construction of a dancer of the present invention.

Referring to FIG. 1, a first preferred embodiment is designed exclusively for the LH and RH lateral metric control since there is no restriction prescribed for the subject matter of application. The ultimate purpose to achieve metric control for the entire configuration is executed by oscillation driven permanent magnet displacement to induce and retrieve data of signals from changed magnetic filed. The first preferred embodiment of the present invention is essentially comprised of a scrolling wheel mechanism (1), a base (2), a dancer (3), a permanent magnet (4), a Hall sensor (5), and a return structure (6). Wherein, the scrolling wheel mechanism (1) comprised of a wheel adapted with electronic circuit board and sensor to achieve the metric operation and control by rotation clockwise and counter-clockwise is related to a prior art. A pivot (11) is each provided in front and back of the scrolling wheel mechanism (1) to stride cross and pivot into a respective slot (21) of the base (2) for the entire scrolling wheel mechanism (1) to provide lateral oscillation through the LH/RH control.

As illustrated in FIGS. 2 and 4, the dancer (3) extends from the pivot (11) and connects to a pendant (31) containing a trough (311) in which is fitted the permanent magnet (4) thereby enabling the permanent magnet (4) in the trough (311) to synchronously oscillate with the dancer (4). Accordingly, the permanent magnet (4) executes oscillation mechanism to drive the permanent magnet (4) to displace and thus to create changes in the magnetic filed. The Hall sensor (5) disposed below the pendant (31) retrieves signals from the changed magnetic field to execute lateral control mechanism.

Figure 3:
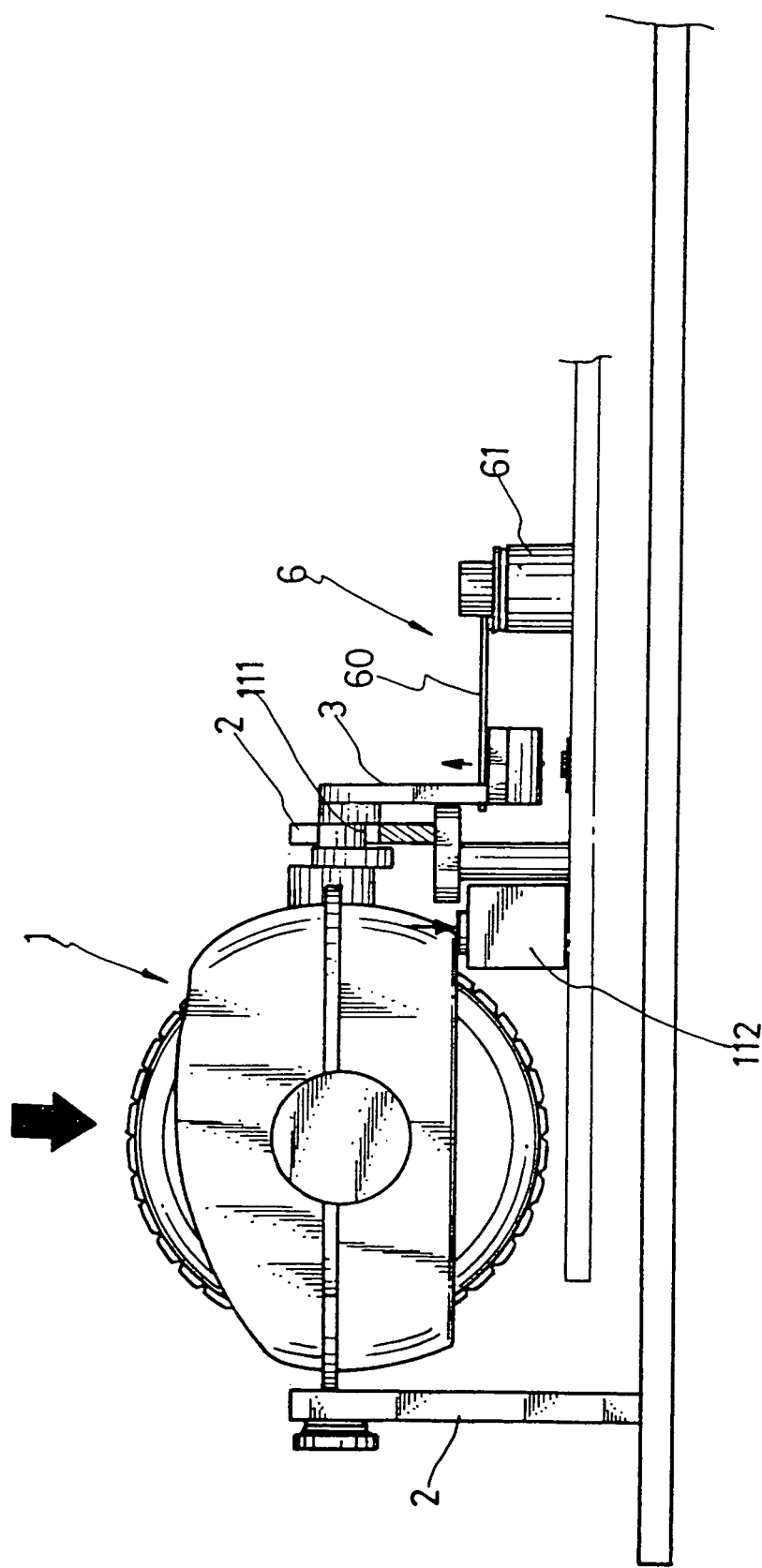
FIG. 3 is a side view of the present invention in operation.

As illustrated in FIG. 2, a groove (111) is provided in the pivot (11) of the dancer (3) in a depth merely equivalent to the distance pressed down by the entire scrolling wheel mechanism (1) to touch a micro-switch (112) disposed below the scrolling wheel mechanism (1) as also illustrated in FIG. 3.

Figure 6:
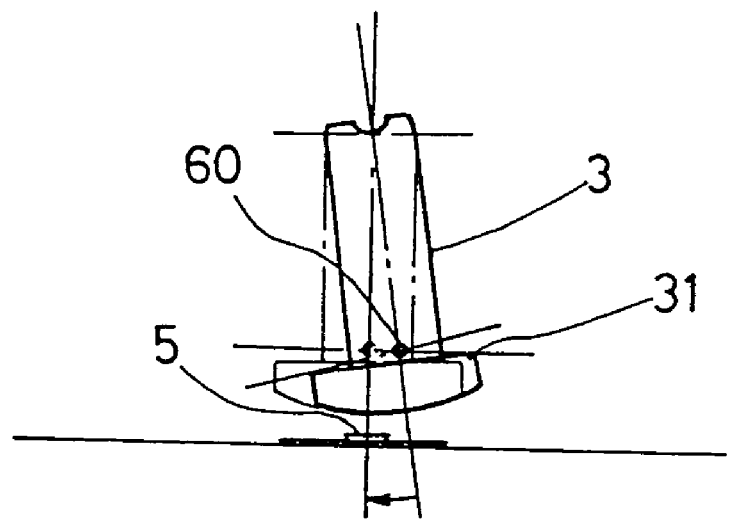
FIG. 6 is a schematic view showing the dancer of the present invention is swinging to its right.
Figure 7:
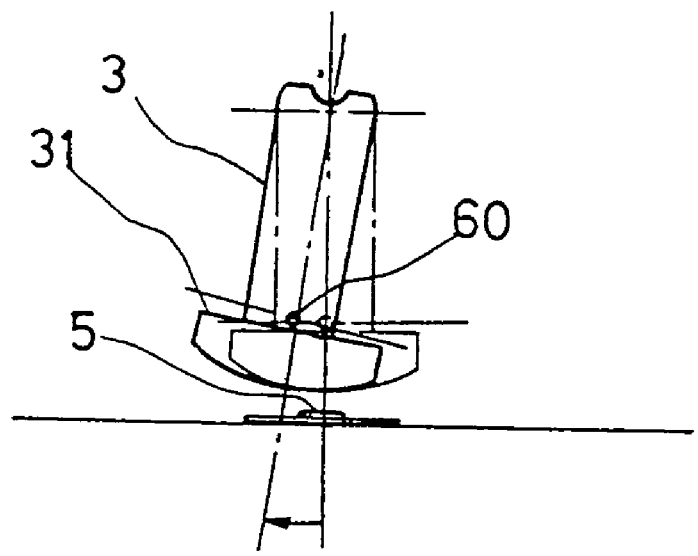
FIG. 7 is a schematic view showing the dancer of the present invention is swinging to its left.
Figure 9D:
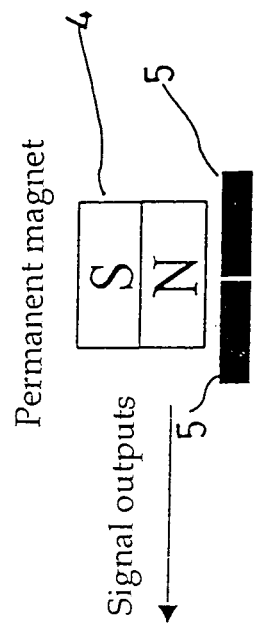
FIGS. 9A, 9B, 9C and 9D are schematic views of a second preferred embodiment of a permanent magnet and a Hall sensor of the present invention.
Figure 9A:
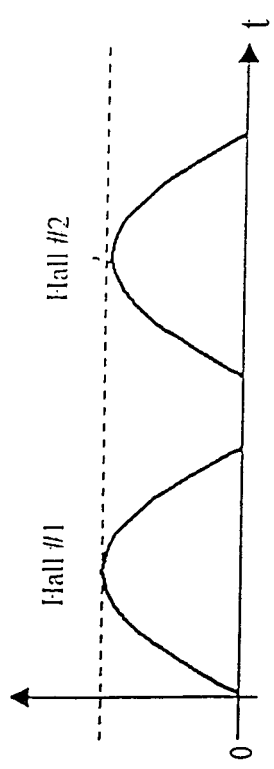
Figure 9B:
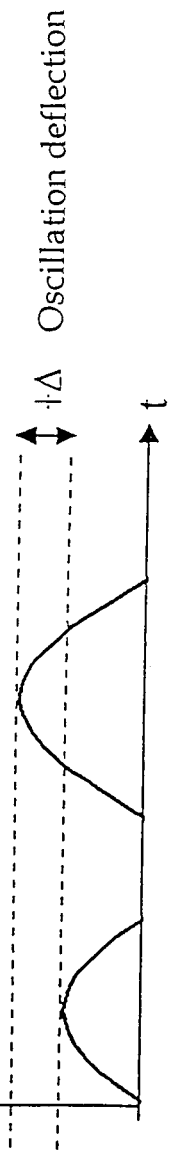
Figure 9C:
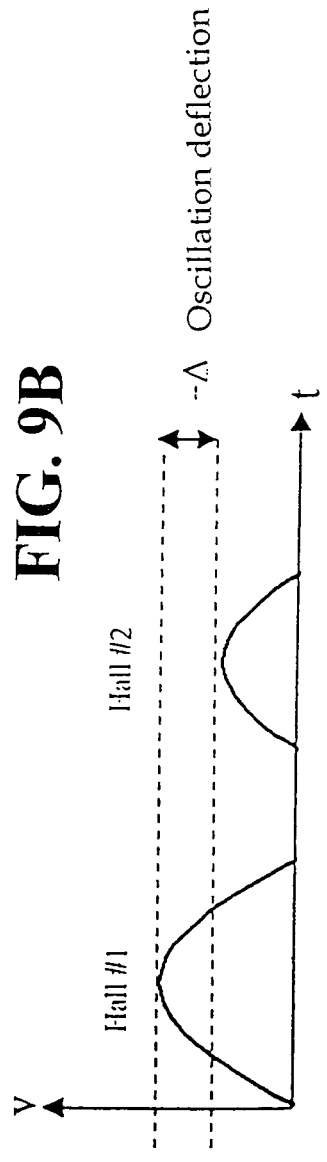
Figure 10:
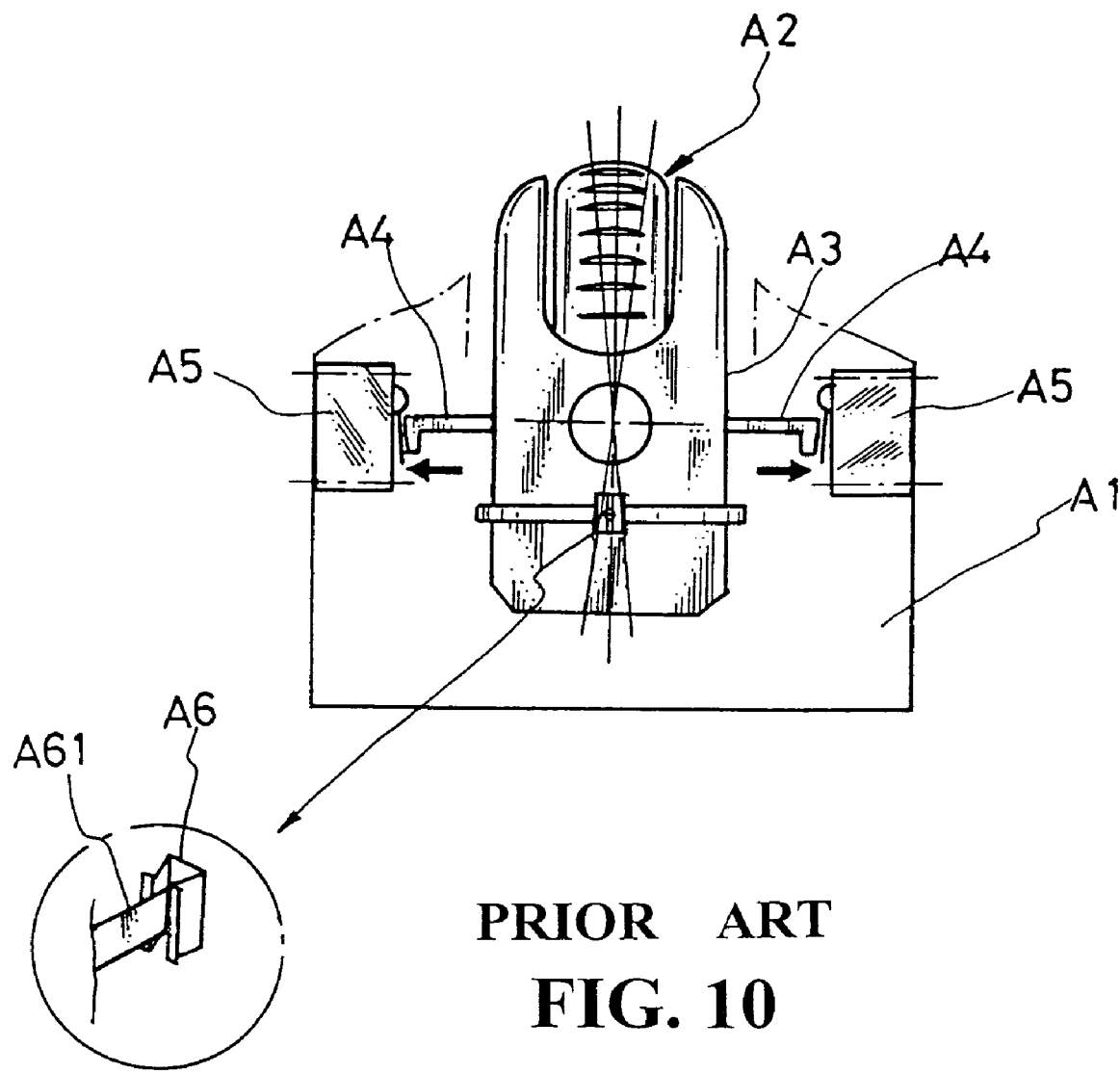
FIG. 10 is a schematic view showing LF and RH control construction of the prior art.

Now referring to FIG. 1, the return structure (6) is essentially comprised of an elastic return stick (60) secured in position by a post (61) and extending through a guide slot (62) provided on the post (61) for a length merely to align and pass through the dancer (3) to make the elastic return stick (6) synchronously oscillate with the dancer (3). As illustrated in FIGS. 6 and 7, the elastic return stick (60) in normal status is always located at the very central position, and automatically returns to its original position by its inherited elasticity when the dancer (3) oscillates. Since the elastic return stick (60) is not subject to the direction of the force applied, the entire scrolling wheel mechanism (1) returns to its original place upward to execute the return function. Therefore, when the scrolling wheel mechanism (1) is pressed by externally applied force, it returns to its original position by means of the elastic return stick (6) as illustrated in FIG. 3.

The elastic return stick (6) as illustrated in FIGS. 5A and 5B is separately adapted at its extended part with a buffer structure (601) to help achieve stable and smooth return.

As illustrated in FIGS. 8A, 8B, 8C and FIGS. 9A, 9B, 9C and 9D, the configuration of the permanent magnet (4) and the Hall sensor (5) are represented by two preferred embodiments. A first preferred embodiment as illustrated in FIG. 8 has the polarities of the permanent magnet (4) laterally arranged. A single Hall sensor (5) is located below the permanent magnet to retrieve signals of changed magnetic field resulted from the oscillating permanent magnet (4) with the waveform pattern of the outputted signals as illustrated in FIGS. 8A, 8B and 8C. The linear area in the pattern of the waveform present the optimal signals for the judgment of the linear displacement vector while signals outside the linear area though not applied as the optimal signals in judging the displacement vector are used for judging the direction where the maximal displacement takes place. Though the oscillation defection in the pattern of waveform may function as the signal for judging the changed linear angle of the oscillation to provide the optimal control mechanism.

Now referring to FIGS. 9A, 9B, 9C and 9D, a second preferred embodiment of the present invention is essentially comprised of the permanent magnet (4) and the Hall sensor (5). Wherein, magnet polarities of the permanent magnet (4) are arranged in having S-pole on the upper layer and the N-pole on the lower layer (or N-pole, upper; and S-pole, lower). Two sets of Hall sensor (5) are arranged at where below the permanent magnet (4) to retrieve the signals of changed magnetic field produced by the oscillation of the permanent magnet (4) with the waveform pattern of the outputted signals as illustrated in FIGS. 9A, 9B, 9C and 9D. Outputted signals from both sets of the Hall sensor (5) in the pattern of the waveform are applied in the judgment of the displacement vector; and the oscillation defection shown in the waveform pattern is applied as signal for the judgment of the oscillation angle to achieve the same optimal control mechanism.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. A magnetic oscillation metric control with return structure for lateral metric control, comprising:
    a scrolling mechanism provided with a first pivot at one end thereof and a second pivot at another end thereof, said first pivot being formed with a groove having a depth equivalent to a distance pressed down by said scrolling mechanism to touch a micro-switch disposed below said scrolling mechanism;
    a base having two slots on each of which is received a respective one of said first and second pivots;
    a dancer extending from said first pivot and connecting to a pendant, said pendant having a trough in which is fitted a permanent magnet thereby enabling said permanent magnet to synchronously oscillate with said dancer and creating changes in magnetic field when said dancer is displaced;
    a Hall sensor disposed below said pendant for retrieving signals from a changed magnetic field;
    a return structure having an elastic return stick and a post, said elastic return stick having an end secured by said post, a length of said elastic return stick extending through a guide slot of said post to align with and pass through said dancer thereby making said elastic return synchronously oscillate with said dancer, said elastic return stick being located at a central position and automatically returning to original position by inherited elasticity when said dancer oscillates, an extended portion of said elastic return stick being provided with a buffer structure for helping return of said elastic return stick.

2. The magnetic oscillation metric control with return structure of claim 1; wherein magnetic polarities of both N- and S-poles of said permanent magnet are laterally arranged, and a single Hall sensor is provided at where below said permanent magnet.

3. The magnetic oscillation metric control with return structure of claim 1; wherein magnetic polarities of said permanent magnet are arranged with S-pole located at an upper layer and N-pole located at a lower layer, and two sets of Hall sensors corresponding to said S- and N-poles are provided at where below said permanent magnet.

* * * * *